(12) United States Patent
Garg

(10) Patent No.: US 6,367,311 B1
(45) Date of Patent: Apr. 9, 2002

(54) METHOD FOR TESTING A WATER-COOLED STATOR OF A GENERATOR FOR LEAKS, AND TEST SKID FOR USE IN THE METHOD

(75) Inventor: Trilok C. Garg, 14102 Weybridge Ct., Bowie, MD (US) 20715

(73) Assignee: Trilok C. Garg, Upper Marlboro, MD (US)

(*) Notice: Subject to any disclaimer, the term of this patent is extended or adjusted under 35 U.S.C. 154(b) by 0 days.

(21) Appl. No.: 09/408,953

(22) Filed: Sep. 30, 1999

(51) Int. Cl.⁷ .................. G01M 3/30; G01M 3/02; F26B 5/04
(52) U.S. Cl. .................. 73/40.5 R; 73/49.1; 73/40
(58) Field of Search ............... 73/40.5 R, 40, 73/49.1, 49.5

(56) References Cited

U.S. PATENT DOCUMENTS

| | | | |
|---|---|---|---|
| 3,012,433 A | * 12/1961 | Blafield | 73/40.5 |
| 3,165,920 A | * 1/1965 | Loomis | 73/40.5 |
| 3,921,436 A | * 11/1975 | Plegat | 73/40 |
| 3,964,292 A | * 6/1976 | Jackson | 73/40.5 R |
| 4,199,975 A | * 4/1980 | Schrock et al. | 73/40.7 |
| 4,216,821 A | * 8/1980 | Robin | 165/11 R |
| 4,373,379 A | * 2/1983 | Obara et al. | 73/40.5 R |
| 4,440,017 A | * 4/1984 | Barton et al. | 73/40.5 R |
| 4,466,481 A | * 8/1984 | Wilson et al. | 165/70 |
| 4,766,557 A | * 8/1988 | Twerdochlib | 364/550 |
| 5,074,672 A | 12/1991 | Emery et al. | 374/147 |
| 5,189,904 A | * 3/1993 | Maresca, Jr. et al. | 73/40.5 R |
| 5,287,726 A | 2/1994 | Burritt | 73/37 |
| 5,325,725 A | 7/1994 | Sanderson et al. | 73/861.21 |
| 5,331,747 A | 7/1994 | Stanton | 34/405 |
| 5,375,457 A | * 12/1994 | Trapp | 73/40.7 |
| 5,492,004 A | 2/1996 | Berg et al. | 73/40.7 |
| 5,635,779 A | 6/1997 | Baer et al. | 310/62 |
| 5,692,314 A | 12/1997 | Schubert et al. | 34/92 |
| 5,701,044 A | 12/1997 | Emshoff et al. | 310/54 |
| 5,736,655 A | 4/1998 | Sekito et al. | 73/865.9 |
| 6,070,453 A | * 6/2000 | Myers | 73/40.5 R |

* cited by examiner

Primary Examiner—Hezron Williams
Assistant Examiner—David J. Wiggins
(74) Attorney, Agent, or Firm—Venable; Norman N. Kunitz

(57) ABSTRACT

A test skid includes equipment for drying water channels in the stator of a water-cooled generator prior to testing the stator for water leaks. The equipment includes a pressure section for supplying compressed air to the stator and a vacuum section for applying vacuum to the stator. The pressure section includes an air receiver and a heater to heat compressed air as it flows from the air receiver to the stator. The hot air warms the stator and facilitates removal of water from the water channels by thermal evaporation. After the stator is thoroughly dry, the equipment on the test skid is used for pressure decay and vacuum decay testing of the stator.

10 Claims, 6 Drawing Sheets

METHOD FOR TESTING A WATER-COOLED STATOR OF A GENERATOR FOR LEAKS, AND TEST SKID FOR USE IN THE METHOD

BACKGROUND OF THE INVENTION

The present application is directed to techniques for testing a water-cooled generator for leaks, and more particularly to improvements in the process for drying water channels in the generator's stator to prepare the stator for pressure-decay testing and vacuum-decay testing.

FIG. 1A schematically illustrates a stator 10 of a water-cooled generator. The stator 10 comprises of stator bars 14, as shown in FIG. 1B, which are formed by uniting a number of individual conductors 16 in a meandering pattern. The meandering pattern (transposition) helps minimizing electrical losses. A cross-sectional view of one of the conductors 16 is shown in FIG. 1C. As will be seen, the conductor 16 has a channel 18 for passage of water to cool the stator. Although not shown, the stator bars 14 are covered with electrical insulation.

A metal fixture called a water box (not illustrated) is connected to each end of every stator bar 14. Further metal fixtures (not illustrated) are then used to hydraulically connect adjacent water boxes and to also electrically connect the stator bars 14 so as to form stator windings. These further metal fixtures are hydraulically connected by electrically insulating fixtures to an inlet header 20 at one end of the stator 10 and to an outlet header 22 at the other end. Thus, by way of the various fixtures, one end of each stator bar 14 is in hydraulic communication with the inlet header 20, and the other end of the stator bar 14 is in hydraulic communication with the outlet header 22. FIG. 1A shows the stator bars 14 in one stator winding loop of the stator 10.

Coupling members 24 and 26 are provided outside the stator 10 to provide fluid communication with the inlet header 20. Similarly, coupling members 28 and 30 are provided outside the stator 10 to provide fluid communication with the outlet header 22. The coupling members 29–30 are accessible from outside the generator itself.

It will be apparent that a number of components are connected together to form the stator 10. Many of these connections are brazed connections, which are susceptible to failure. Water leaks may also form in regions other than the connections. Although the water used for cooling the stator bars 14 is pure, and thus has a very low conductivity, any water that leaks out of joints of the fixtures connected to a stator bar 14 may soak its insulation and thereby degrade the insulation's ability to withstand high voltage. In particularly severe cases, a short circuit due to water leakage may cause catastrophic failure of the stator 10.

Due to the risk of generator failure, or the risk of an unscheduled shut-down for less severe leakage, it has become common practice in the power generation industry to periodically test water-cooled generators for leaks. The General Electric Company, a major manufacturer of generators, has published information about leakage testing in *Technical Information Letter Number* 1098, one version of which was published on Jan. 24, 1995 and was updated by Alan M. Iversen in November of 1996. Further information about testing is provided in a paper by Bruce Faulk et al., entitled "Diagnosing and Repairing Water Leaks in Stator Windings," that was presented at an EPRI (Electric Power Research Institute) conference in 1995.

The periodic testing typically begins by draining the stator and then drying it. After the stator has been thoroughly dried, pressure decay and vacuum decay tests are conducted to confirm that the stator is able to hold pressure and vacuum. If the pressure within the stator falls too rapidly after the stator has been pressurized with compressed air, or if the pressure rises too rapidly after air has been evacuated, then a leak that requires further attention has been detected. The generator is then opened so that further testing can be conducted to identify the site of the leak so that it can be repaired.

Equipment for drying a stator and for conducting the pressure and vacuum decay testing may be collected together on a chassis or housing to provide an arrangement called a test skid. A conventional test skid typically includes an air tank or air receiver for holding compressed air. A compressor is not needed, since most power plants have piping systems for delivering compressed "instrument air" (cleaned and dried air for instrumentation) and compressed "service air" (utility compressed air for pneumatic tools and other applications where instrument air is not necessary). A conventional test skid also includes a vacuum pump. An arrangement of conduits, valves, and sensors for conducting pressure and vacuum drying and for performing the pressure and vacuum decay tests themselves is also present. Auxillary equipment, such as conduits for connecting the skid to the generator, may also be housed on the skid.

The drying procedure using a conventional skid is typically conducted in two stages—a pressure drying stage and a vacuum drying stage. After the stator has been drained, the air receiver is charged with air to a predetermined pressure; the pressurized air is introduced to the stator via one of the upper coupling members 24 or 28; and then the pressurized air is discharged from the stator via a diagonally disposed bottom coupling member 26 or 30. After the pressure falls to a predetermined value, the air receiver is again charged with pressurized air, and this pressurized air is discharged through the stator. A number of such pressure drying cycles are conducted. Next, the stator is closed and air is evacuated. Water that remains trapped in tiny nooks or crevices after completion of the pressure drying stage evaporates into the vacuum and is removed. When the stator is finally dry enough, as indicated by vacuum and dewpoint sensors, it is charged with compressed air to a predetermined pressure, and the pressure is measured periodically during a monitoring interval to determine whether the pressure decays or falls at an acceptably slow rate. During the vacuum decay test, the stator is evacuated and measurements are made during a monitoring interval to determine whether the vacuum decays (in this case, meaning that the sub-atmospheric pressure rises) at an acceptably slow rate.

The drying procedure in preparation for the pressure and vacuum decay testing can be conducted fairly expeditiously if it is begun while the generator remains hot, soon after it has been taken off line. If there is a delay, however, the drying procedure may take a week or more, particularly if the generator is housed in an unheated building. One reason for this may be that ice crystals form due to cooling because of rapid evaporation of water droplets during the vacuum drying stage. The ice crystals sublimate slowly into the vacuum, and moreover may clog crevices which contain residual water.

More than a year before the present application was filed, the inventor observed a test skid that was being operated by employees by a company then named MDA, or Mechanical Dynamic Analysis. The skid included a small heater which slightly raised the temperature of compressed air entering the air receiver. The purpose of this may have been to avoid water condensation inside the air receiver.

SUMMARY OF THE INVENTION

An object of the present invention is to provide an improved method for testing water-cooled generators and a test skid for use in the method.

Another object is to provide a method to accelerate drying-out of a stator before pressure and/or vacuum decay testing is conducted.

Another object is to provide a test skid in which the same dewpoint sensor may be used during both pressure decay and vacuum decay testing.

These and other objects which will become apparent in the ensuing detailed description can be attained by providing a method for testing a water-cooled generator having a stator with water channels, which method includes the steps of drying the water channels and then conducting at least one of a pressure decay test and a vacuum decay test. The step of drying the water channels includes receiving compressed air into an air receiver, conveying compressed air from the air receiver along a flow path from the air receiver to the water channels of the stator, and heating the compressed air as it moves along the flow path from the air receiver to the water channels.

When hot air is injected into the stator during the pressure drying stage, the hot air loses heat to the stator. The heat transferred during a number of cycles of pressure drying raises the temperature of the stator. As the stator temperatures rises, the loss of heat by the incoming compressed air to the stator is reduced, so that the air temperature also rises. Psychrometric charts show that the water retention of air depends in a complex way on the temperature of the air, but in general it can be said that water retention increases rapidly with increasing temperature. For example, the amount of water that can be retained as vapor in one pound of air at 80° F. is about four times as great as the amount of water that can be retained as vapor in one pound of air at 40° F.

The increased moisture-carrying ability of heated air accelerates removal of water from the stator during the pressure drying stage. It also leaves the stator warm at the start of the vacuum drying stage. This means that ice crystals are less likely to form in the first place, since the temperature of the residual water in crevices and so forth is warmer to begin with, and also that stator heat is available to prevent excessive cooling during the vacuum drying.

DESCRIPTION OF THE PREFERRED EMBODIMENT

Figure 2:
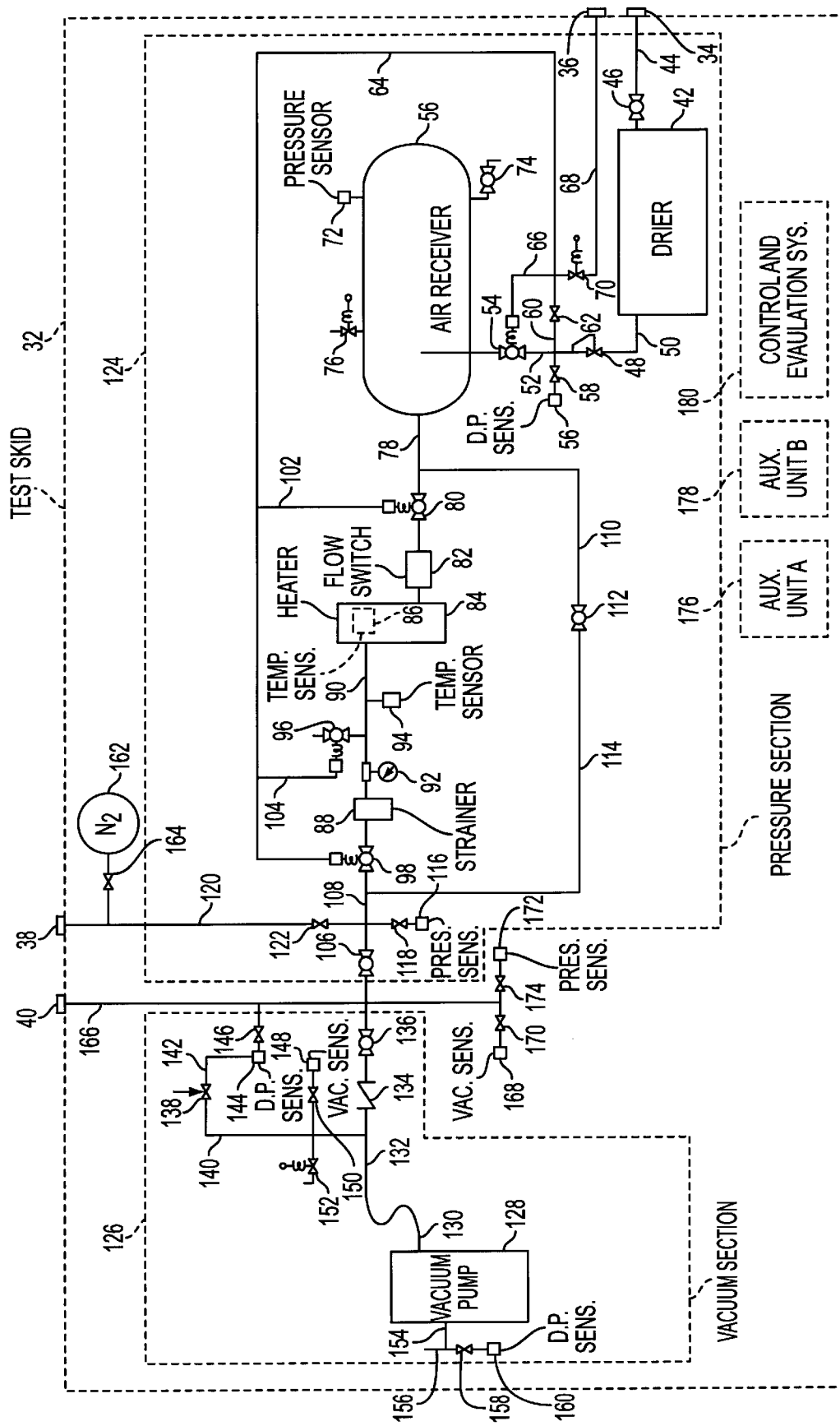
FIG. 2 is a schematic drawing illustrating components of a test skid according to the present invention.

With reference to FIG. 2, a test skid 32 in accordance with the present invention is provided with quick-connect coupling members 34, 36, 38, and 40. Coupling member 34, which receives compressed air from an air distribution system in a power plant (not illustrated in FIG. 2), is connected to an air dryer 42 via a conduit 44 having a manually operable valve 46 in it. A pressure regulator 48 is connected to the outlet of the dryer 42 by a conduit 50. A conduit 52 connects the outlet of the pressure regulator 48 to a remotely operable valve 54, which is opened to admit compressed air to an air receiver 56 or to block compressed air from the air receiver. The nature of the remotely operable valve 54 will be further described shortly.

The conduit 52 is connected to a first dewpoint sensor 56 by a conduit (not numbered) having a manually operable valve 58 in it. The conduit 52 is also connected by a conduit 60 to a manually operable valve 62, which in turn is connected to a pneumatic control conduit 64. A branch 66 of the pneumatic control conduit is connected to the remotely operable valve 54.

The remotely operable valve 54 includes a primary valve portion that is opened or closed by compressed air. It also includes a secondary valve portion with an electrical solenoid, the secondary valve portion admitting or blocking compressed air from the primary valve portion. Such remotely operable valves are known in the art. The remotely operable valve 54 can be looked upon as an electrically operated valve that receives a pneumatic boost, assuming that compressed air is present in the pneumatic control conduit 64.

The coupling number 36 is connected to the pneumatic control conduit 64 by way of a conduit 68 having a solenoid-controlled valve portion 70 in it. The valve portion 70 is the secondary valve portion of another remotely controlled valve that will be discussed later.

A first pressure sensor 72 senses the pressure inside air receiver 56. The compressed air in receiver 56 can be vented to the atmosphere by a manually operable valve 74. A solenoid-controlled relief value 74 is also provided for venting compressed air from receiver 56 to the atmosphere.

The outlet of air receiver 56 is connected by a conduit 78 to the inlet of a remotely operable valve 80, whose outlet is connected by a conduit (not numbered) to the inlet of a flow switch 82. As will discussed in more detail later, the flow switch comprises an electrical switch that opens or closes depending on the rate at which air is flowing. The outlet of the flow switch 82 is connected by a conduit (not numbered) to the inlet of an electrical heater 84, which includes resistance heating elements (not illustrated) whose temperature is sensed by a first temperature sensor 86 (preferably a thermocouple). Although not shown, the heater 84 also includes two temperature-responsive switches (adjustable temperature, kept below 150° F.) that are connected in series to break an electrical circuit to the resistive heating elements should the temperature of air inside heater 84 exceed 150° F. These temperature-responsive switches may comprise bimetallic strips or bulb-type temperature sensors.

The outlet of heater 84 is connected to a strainer 88 by a conduit 90 having a dial-type mechanical thermometer 92 in it. The strainer 88 is present to catch any debris that may be released from heater 90, particularly fragments of the resistive heating elements should they burn out. A second temperature sensor 94 (preferably a thermocouple) is connected to the conduit 90. A remotely operable valve 96 is also connected to the conduit 90 to permit compressed air to be vented to the atmosphere.

The outlet of strainer 88 is connected by a conduit (not numbered) to the inlet of a remotely operable valve 98. As has previously been described, such a remotely operable valve includes a primary valve portion that is operated pneumatically under the control of a secondary valve portion that is actuated by a solenoid to control whether the primary valve portion receives compressed air. The remotely operable valve 98 receives its compressed air for operation from a branch 100 of the pneumatic control conduit 64. Similarly, remotely operable valves 80 and 96 receive compressed air for operation via branches 102 and 104 of the pneumatic control conduit 64.

The outlet of valve 98 is connected to the inlet of a manually operable valve 106 by a conduit 108. A conduit 110 connects the conduit 78 to the inlet of a manually operable valve 112, whose outlet is connected by a conduit 114 to the conduit 108. The valve 112 serves as a bypass valve, which can be opened to bypass the air-flow path containing heater 84.

A second pressure sensor 116 is connected to the conduit 108 by a conduit (not numbered) having a manually operable valve 118 in it. Furthermore, the conduit 108 is connected by a conduit 120 having a manually operable valve 122 in it to the coupling member 38.

The elements 42–120 form a pressure section 124. The test skid 32 also includes a vacuum section 126, along with two auxiliary units and an electrical control and evaluation system that will be discussed later. The vacuum section 126 has a vacuum pump 128 with a pumping inlet that is connected by a flexible conduit portion 130 to a rigid conduit portion 132. The conduit portion 132 is connected to a check valve 134, which in turn is connected by a conduit (not numbered) to a manually operable valve 136.

The conduit portion 132 is also connected to one port of a manually operable, two-way valve 138 by a conduit 140. A second port of the valve 138 is connected by a conduit 142 to a second dewpoint sensor 144. The valve 138 also has a third port which communicates with the atmosphere. In one position of the valve 138, the conduit 142 is connected to the conduit 140 and thus ultimately to the vacuum pump 128. In another position of the valve 138, the conduit 142 is connected to the third port of the valve 138, meaning that the conduit 142 is in communication with the atmosphere, and the port that is connected to conduit 140 is closed. A conduit (not numbered) with a manually operable valve 146 in it is connected to the sensor 144.

The conduit 140 is also connected to a first vacuum sensor 148 by a conduit (not numbered) with a manually operable 150 in it. A solenoid-operated valve 152 is also connected by an unnumbered conduit to the conduit 140. The conduit 140 communicates with the atmosphere when the valve 152 is in its open position.

A conduit 154 at the outlet port of vacuum pump 128 is connected to a conduit 156 having an end that opens to the atmosphere. The other end of the conduit 156 is connected to a manually operable valve 158, which is connected by a conduit (not numbered) to a third dewpoint sensor 160.

In addition to the vacuum section 126 and the pressure section 124, the test skid 32 includes a cylinder 162 of compressed nitrogen gas. The cylinder 162 is connected to the conduit 120 by a conduit (not numbered) with a manually operable valve 164 in it.

A conduit 166 is connected to the quick-connect coupling member 40. The valve 106 of pressure section 124 is connected by a conduit (not numbered) to the conduit 166, and the valves 136 and 146 of the vacuum section 126 are also connected by conduits (not numbered) to the conduit 166. Furthermore, a second vacuum sensor 168 is connected by a conduit (not numbered) having a manually operable valve 170 in it to the conduit 166. Similarly, a third pressure sensor 172 is connected by a conduit (not numbered) having a manually operable valve 174 in it to the conduit 166.

Figure 3:
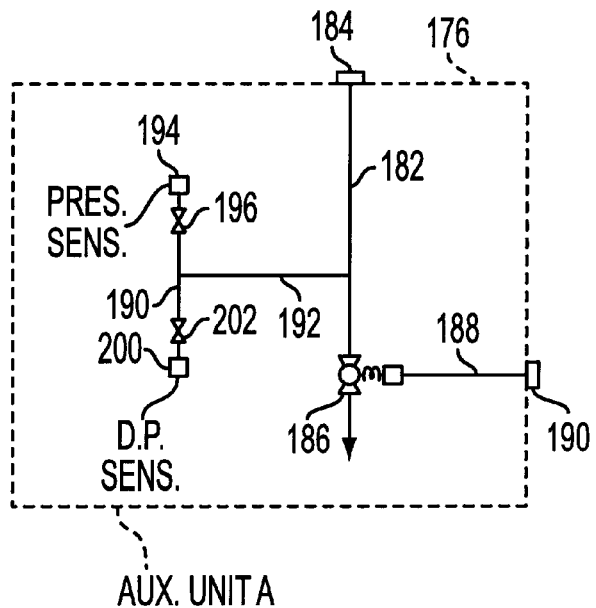
FIG. 3 is a schematic drawing of an auxiliary unit that is carried along with the test skid.

The test skid 32 also includes an auxilliary unit 176 (see FIG. 3; also called auxiliary unit A), an auxiliary unit 178 (see FIG. 4; also called auxiliary unit B), an electrical control and evaluation system 180 (see FIG. 7), and incidental equipment such as conduits with quick-connect coupling members (not illustrated in FIG. 2). The auxiliary units 176 and 178 will now be described with reference to FIGS. 3 and 4.

The unit 176 includes a conduit 182 leading from a quick-connect coupling member 184 to the inlet of a remotely operable valve 186. The outlet of valve 186 is opened to the atmosphere. The valve 186 receives compressed air for operation via a conduit 188 that terminates in a quick-connect coupling member 190. A conduit 190 is connected by a conduit 192 to the conduit 182. A fourth pressure sensor 194 is connected to the conduit 190 by a manually operable valve 196. Similarly, a fourth dewpoint sensor 200 is connected to the conduit 190 by a manually operable valve 202.

It was noted earlier that solenoid-controlled valve portion 70 (see FIG. 2) is part of a remotely operable valve whose pneumatic valve portion lay elsewhere. The remotely operable valve in question is valve 186, and it is the pneumatic valve portion of valve 186 that is disposed in the auxiliary unit 176. The splitting of the valve portions in this manner makes it unnecessary to run electrical wires for the solenoid valve portion to the location of auxiliary unit 176.

Figure 4:
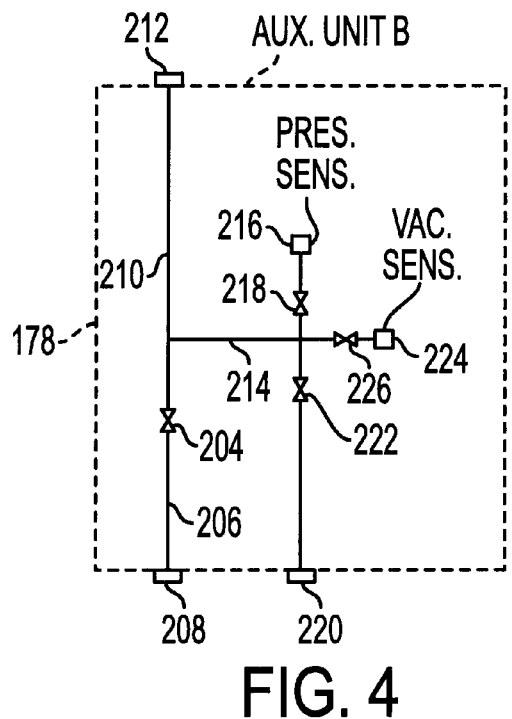
FIG. 4 is a schematic drawing of another auxiliary unit that is carried along with the test skid.

With reference next to FIG. 4, the auxiliary unit 178 includes a manually operable valve 204 that is continuously variable between an open position and a closed position. That is, the valve 204 has an aperture that can be manually set at closed, open, or a continuous range of intermediate positions between opened and closed. One end of the valve 204 is connected by a conduit 206 to a quick-connect coupling member 208. The other end of valve 204 is connected by a conduit 210 to a quick-connect coupling member 212. A conduit 214 is connected to the conduit 210. The conduit 214 is connected to a fifth pressure sensor 216 by a conduit (not numbered) with a manually operable valve 218 in it. The conduit 214 is also connected to a quick-connect coupling member 220 by a conduit (not numbered) with a manually operable valve 222 (which has a continuous range of intermediate positions between open and closed positions) in it. A third vacuum sensor 224 is connected by a conduit (not numbered) with a manually operable valve 226 to the conduit 214.

The procedure for using the test skid 32 to test the stator 10 for leaks will now be described. An overview will first be presented, followed by a more detailed exposition.

Figure 1A:
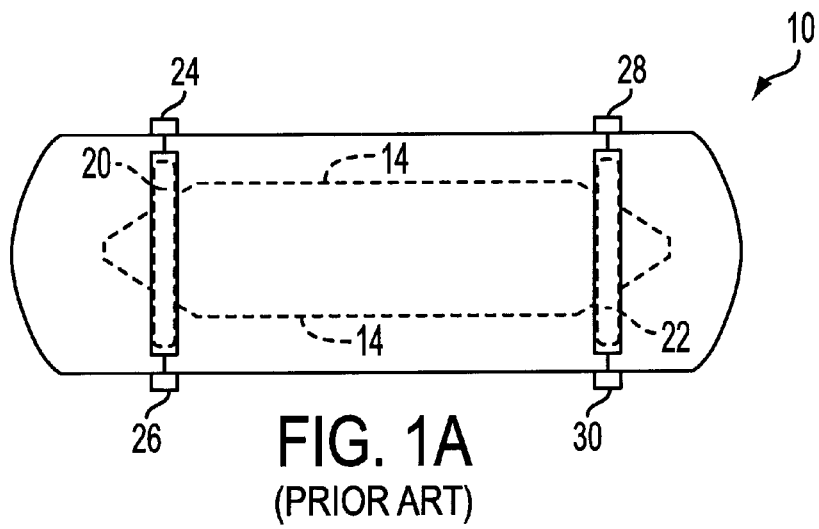
FIG. 1A is a front view schematically illustrating a stator and headers in a water-cooled generator.
Figure 1B:
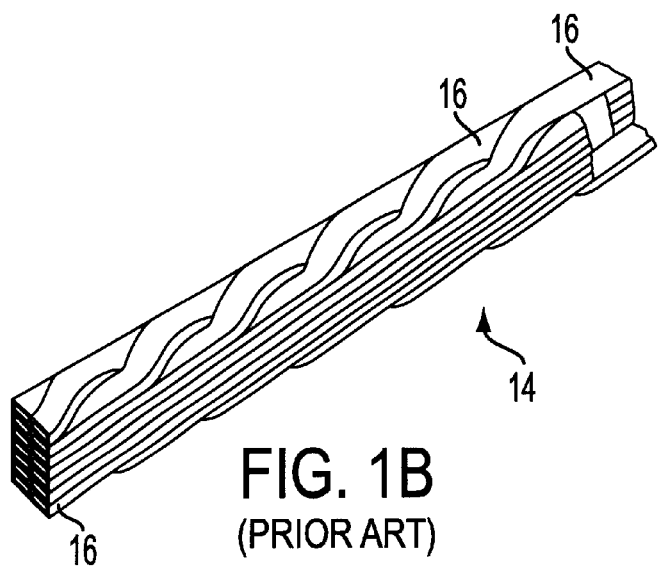
FIG. 1B is a perspective view illustrating a stator bar of FIG. 1B.
Figure 1C:
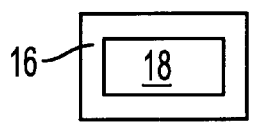
FIG. 1C is a cross-sectional view of one of the conductors of a stator bar.
Figure 5:
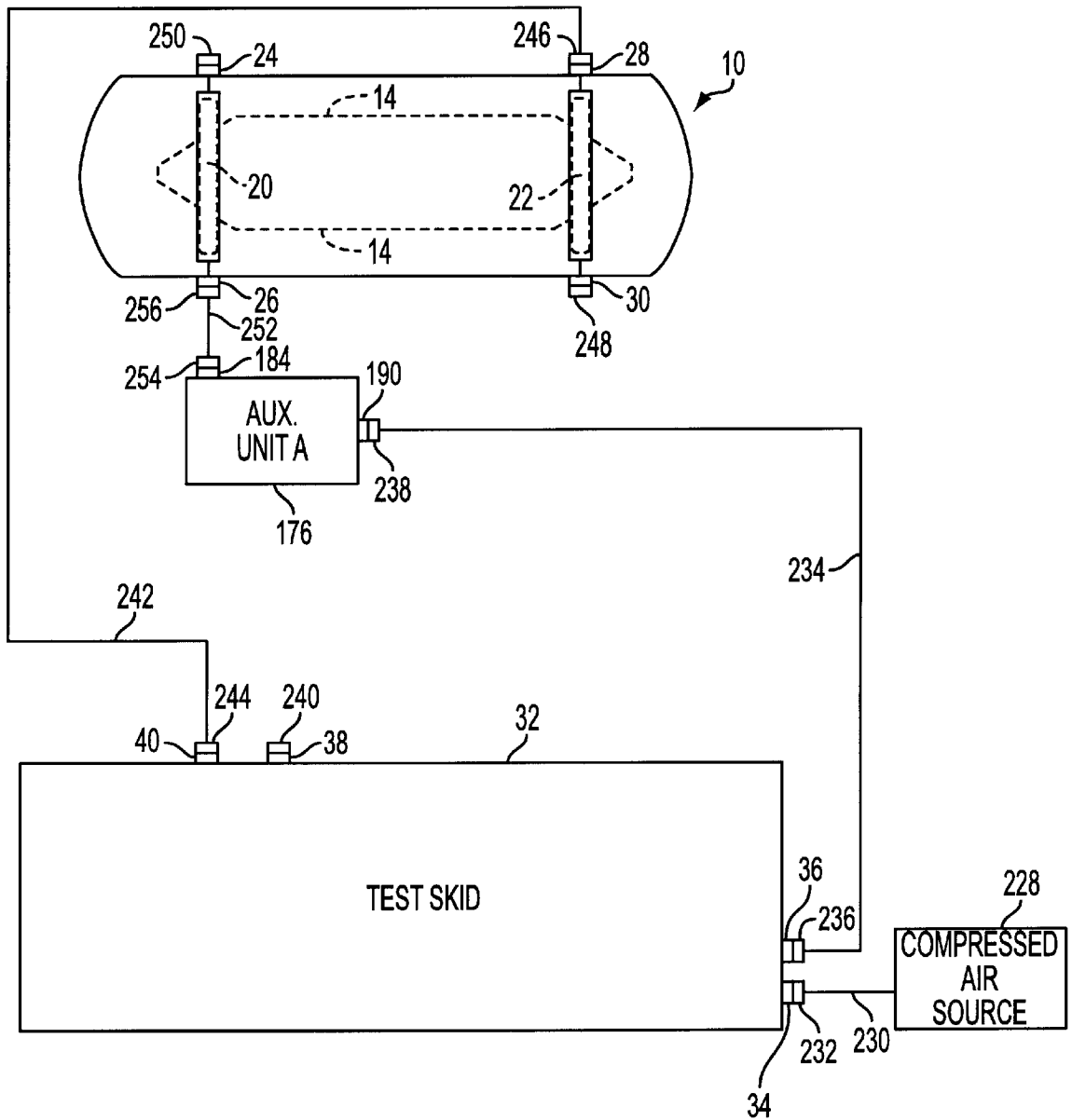
FIG. 5 illustrates the test skid connected to the generator during the pressure drying stage.

With reference to FIG. 1A, water is first drained from the stator 10 via the bottom coupling members 26 and 30. The stator 10 is then dried in preparation for a pressure decay test and a vacuum decay test. The drying procedure has a pressure drying stage and a vacuum drying stage, with the pressure drying stage being divided into two portions. The pressure drying stage will now be described, with reference to FIGS. 2, 3, and 5. The discussion that follows includes parameters that are appropriate for a generator with a stator 10 having three phases and 84 stator bars 14, or 28 stator bars per phase.

Reference number 228 identifies a compressed air source, such as an air distribution system in a power plant, that supplies compressed air at a pressure in the range of 80 to 100 PSI. A conduit 230 terminates in a quick-connect coupling member 232 which plugs into the quick-connect coupling member 34 to convey the compressed air to the test skid 32. A conduit 234 has a quick-connect coupling member 236 which plugs into the quick-connect coupling member 36, and another quick-connect coupling member 238 which plugs into the quick-connect coupling member 190 of the auxiliary unit 176. A conduit 242 has a quick-connect coupling member 244 which plugs into the quick-connect coupling member 40 and a quick-connect coupling member 246 which plugs into the quick-connect coupling member 28 on the stator 10. A cap 248 plugs into the quick-connect coupling member 30 to close it off. A cap 250 closes off the quick-connect coupling member 24. A conduit 252 has a quick-connect coupling member 254 which plugs into the quick-connect coupling member 184 of the unit 176, and a quick-connect coupling member 256 which bolts into the quick-connect coupling member 26 of the stator 10.

At the beginning of the pressure drying stage, the vacuum section 126 is substantially isolated from the conduit 166 by closing valve 136. It is not entirely isolated, however, since valve 146 is opened and valve 138 is set so that conduit 142 is vented to the atmosphere. As a result, air from conduit 166 flows through dewpoint sensor 144 during the pressure drying stage. The valve 146 has a very small aperture, though, so it is only a small portion of the air in conduit 166 bleeds off through the valve 146, sensor 144, conduit 142, and valve 138 to the atmosphere. Nevertheless, the slight bleeding-off of air means that the dewpoint sensor 144 is available for use during the pressure drying stage since air is flowing through it.

Additionally, in preparation for the pressure drying stage, valve 170 is closed to isolate vacuum sensor 168 from the conduit 166, and valve 174 is opened to connect the pressure sensor 174 to the conduit 166. The valve 106 is opened to connect pressure section 124 to the conduit 166. Valves 122 and 164 are closed to isolate the conduit 108 from the nitrogen cylinder 162, and valve 118 is opened to connect the pressure sensor 116 to the conduit 108. Furthermore, valve 58 is opened to connect the dewpoint sensor 56 to the conduit 52, and valve 62 is opened to connect the conduit 52 to the pneumatic control conduit 64. Valve 46 is opened and valve 74 is closed. Valve 70 is electrically controlled to be closed. Valve 76 is an electrical pressure relief valve and normally remains closed.

It has previously been noted that the pressure drying stage has two portions. In the first portion, remotely operable valves 80, 96, and 98 are closed and heater 84 is switched off. The valve 112 is opened to bypass heater 84 and other elements in the heater's branch. As a result, the air receiver 56 communicates with conduit 166 via conduits 78 and 110, the opened valve 112, conduits 114 and 108, and the opened valve 106.

The remotely operable valve 186 in auxiliary unit 176 is initially closed, by closing the solenoid-controlled valve portion 70 in the pressure section 124. The valves 196 in the unit 176 is normally opened to connect sensor 194 to the conduit 190.

With the relevant valves set as discussed above, the first portion of the pressure drying stage is started by opening remotely operable valve 54, thus allowing compressed air to enter the air receiver 56. The incoming air is dried by the dryer 42 so that it has a very low dewpoint (for example, in the range of −20° F. to −40 ° F.). The pressure of the dried air is regulated to a maximum predetermined value (for example, 80 PSI) by the regulator 48, and its dewpoint is monitored by sensor 56. If sensor 56 measures a dewpoint over the predetermined dewpoint range (e.g., over −20° F.), either dryer 42 is malfunctioning or the compressed air source 228 contains excessive moisture. The air pressure builds in receiver 56, and also in conduits 78, 110, 114, 108, 166, 242, and stator bars 14. The pressure in air receiver 56 is monitored by pressure sensor 72, and solenoid-controlled relief valve 76 is opened if the pressure rises above a predetermined value (for example, 90 PSI). When the air pressure in the system reaches a predetermined first value, usually 30 PSI (this pressure value is based on measurements by sensor 72), the remotely operable valve 54 is closed and the remotely operable 186 is opened. The compressed air then discharges through valve 186 to a drain (not illustrated) at the power plant. The compressed air existing the generator 10 carries water droplets and vapor with it when the compressed air blasts out. After the pressure has dropped to a second predetermined value, usually 10 PSI, the valve 186 is closed and the valve 54 is opened, whereupon the pressure begins rising to the first predetermined value again in preparation for another cycle. A number of such drying cycles, building up to the first predetermined pressure value and discharging the compressed air through stator 10 until the pressure falls to the second predetermined pressure value, are usually included in the first portion of the drying stage. For example, there might be 75 cycles, one after the other.

After completion of the first portion of the pressure drying stage, the air flow path in pressure section 124 is changed in preparation for the second portion. Valve 112 is closed and valves 80 and 98 are opened. Valve 96 remains closed.

After the flow path has been changed, valve 186 in the auxiliary unit 176 is closed and valve 54 is opened to permit compressed air to enter the air receiver 56. When the pressure in the system reaches a third predetermined value, usually 60 PSI, the valve 186 is opened and 54 is closed. Note that, with the pressure in the system, a "snoop test" is preferably conducted (this entails applying a soap solution to joints and checking for bubbles) to ensure that there are no leaks in any of the coupling connections that may be subjected to air pressure. Compressed air flows through the valve 80 and the flow switch 82, which includes a switch that is responsive to the air flow rate. This switch has a hysteresis characteristic. When the air flow rate is increasing, the switch closes when the flow rate reaches 30 standard cubic feet per minute. When the flow rate is falling, the switch opens when it falls to 20 standard cubic feet per minute. Heater 84 is turned on when the flow switch 82 is closed to supply hot air to the stator bars 14. Heater 84 is a 7.5 KW unit and would overheat if it were turned on without flowing air to cool it. The temperature sensor 86 within heater 84 monitors the temperature of the resistive heating elements. If the measured temperature exceeds 800° F. (the manufacturer permits up to 1400° F.) the heater is turned off. Although not shown, the heater 84 also has a pair of temperature-responsive switches that are connected in series with the outlet air temperature sensor switch 94. If the temperature of the air within heater 84 or at the heater outlet exceeds the temperature set point, generally 150° F. or below, one or more of these switches will open and the heater will be turned off. The temperature sensor 94 also provides electronically the temperature of the heated air down stream from heater 84, and temperature gauge 92 permits the technician who is conducting the testing to obtain a visual read-out of the temperature without relying on electrical measurements.

Strainer 88 is present to catch any debris that might be released by heater 84, including fragments of the resistive heating elements should the heater 84 burn out. Should debris enter the stator bars 14 it might cause a serious problem.

After the pressure within air receiver 56 has fallen to the second predetermined value, such as 10 PSI, heater 84 is turned off by virtue of a low flow rate sensed by flow switch 82, valve 186 is closed, and valve 54 is opened to begin building up the pressure again. Such cycles of building up the air pressure, heating the air, and then discharging it through stator bars 12 typically continue for 4 to 5 hours, with perhaps 50 cycles being conducted per hour. Then pressure from the generator is released and the coupling member 246 and cap 250 are switched, so that cap 250 is plugged into coupling member 28 and coupling member 246 is plugged into coupling member 24. Furthermore, cap 248 and coupling member 256 are interchanged, so that cap 248 is plugged into coupling member 26 and coupling member 256 is plugged into coupling member 30. Instead of flowing from outlet header 22 to inlet header 20, the blasts of heated air now flow from inlet header 20 to outlet header 22. This time, cycles of building up pressure and discharging heated air through the stator 10 are conducted until no more mist is seen coming out of valve 186, generally 3 to 4 hours. The connections to the headers 20 and 22 are reversed again and further cycles conducted until no mist is seen coming out of valve 186.

The temperature of the compressed air as it enters stator 10 varies depending upon several factors, including the ambient temperature and heat loss along the flow path from heater 84 to the generator. The conduits along this flow path, and particularly conduit 242, are preferably insulated thermally to reduce the heat loss. One factor influencing the temperature of the compressed air as it enters stator 10 is the flow rate of the air. When air is flowing rapidly through the heater 84, its temperature does not rise as high as it does later during the discharge, when the pressure and thus also the flow rate fall off. At its hottest, however, the air just prior to entering stator 10 has a temperature above about 120° F., with 150° F. being preferred.

If the stator 10 is initially cold, the heated air entering the stator rapidly loses its heat to the stator, which warms up as the air itself cools down. That is, heat is transferred to the stator. Repeated cycles of hot air warm the stator, and as this occurs the equilibrium temperature of the air inside the stator also rises. Heated air can hold much more water vapor than cold air, and of course the elevated temperature in stator 10 also increases the rate of evaporation of water droplets in any cracks and crevices that may be present. The relationship between air temperature and retention of water in the air is a complex one which appears to be fundamentally exponential. For example, at −20° F., one pound of air will hold five grains of water vapor, while at 40° F., a pound of air will hold 40 grains of water vapor and at 80° F., a pound of air will hold 160 grains of water vapor.

During the second portion of the pressure drying procedure, using heated air, the technician conducting the test can monitor the progress of the drying of the stator by observing a cloud of fog at the outlet of valve 186 (or, more usually, at a drain where a conduit from the outlet of valve 186 discharges). As the number of cycles increases, the cloud becomes smaller and smaller and then vanishes. However, the second portion of the pressure drying stage preferably continues until the dewpoint measured by sensor 200 falls to within a few degrees of the dewpoint measured by sensor 144. If the dewpoint of the air exiting the stator 10 is the same as or only slightly higher than the dewpoint of the air before it entered stator 10, the air is clearly picking up little moisture within the stator 10. However, to ensure that most of the moisture is removed, hot air drying is continued further with the air flow direction reversed in the stator bars 14 once more as described above, until no more moisture is seen coming out of valve 186. It should be noted that heater 84 is turned off before dewpoint checks are made, since otherwise the dewpoint sensors might be damaged.

Although the stator bars 14 are quite dry at the conclusion of the second portion of the pressure drying stage, it may not be dry enough for the vacuum decay test. The problem is that the stator bars 14 are pumped down to a hard vacuum during the vacuum decay test, and leakage is determined on the basis of how much the vacuum softens over a period of time. Water evaporates rapidly into a vacuum, and produces a relatively large volume of vapor. Consequently, even minute amounts of water in hairline fissures or in corners could undermine the reliability of the vacuum decay test.

The vacuum drying stage removes even minute quantities of water that may remain after the pressure drying stage. In preparation for the vacuum drying stage valve 106 is closed to isolate pressure section 124 from conduit 166, and valve 174 is closed to isolate pressure sensor 172. Valve 170 is opened to connect vacuum sensor 168 to conduit 166; valve 150 is opened to connect vacuum sensor 148 to conduit 140; and valve 158 is opened to connect sensor 160 to conduit 156. Valve 146 is opened (or, rather, it is not closed after the pressure drying stage) and valve 138 is set so that the conduit 140 is in communication with the conduit 142.

In the auxiliary unit 178, valves 204, 218 and 222 are closed, and valve 226 is opened.

Figure 6:
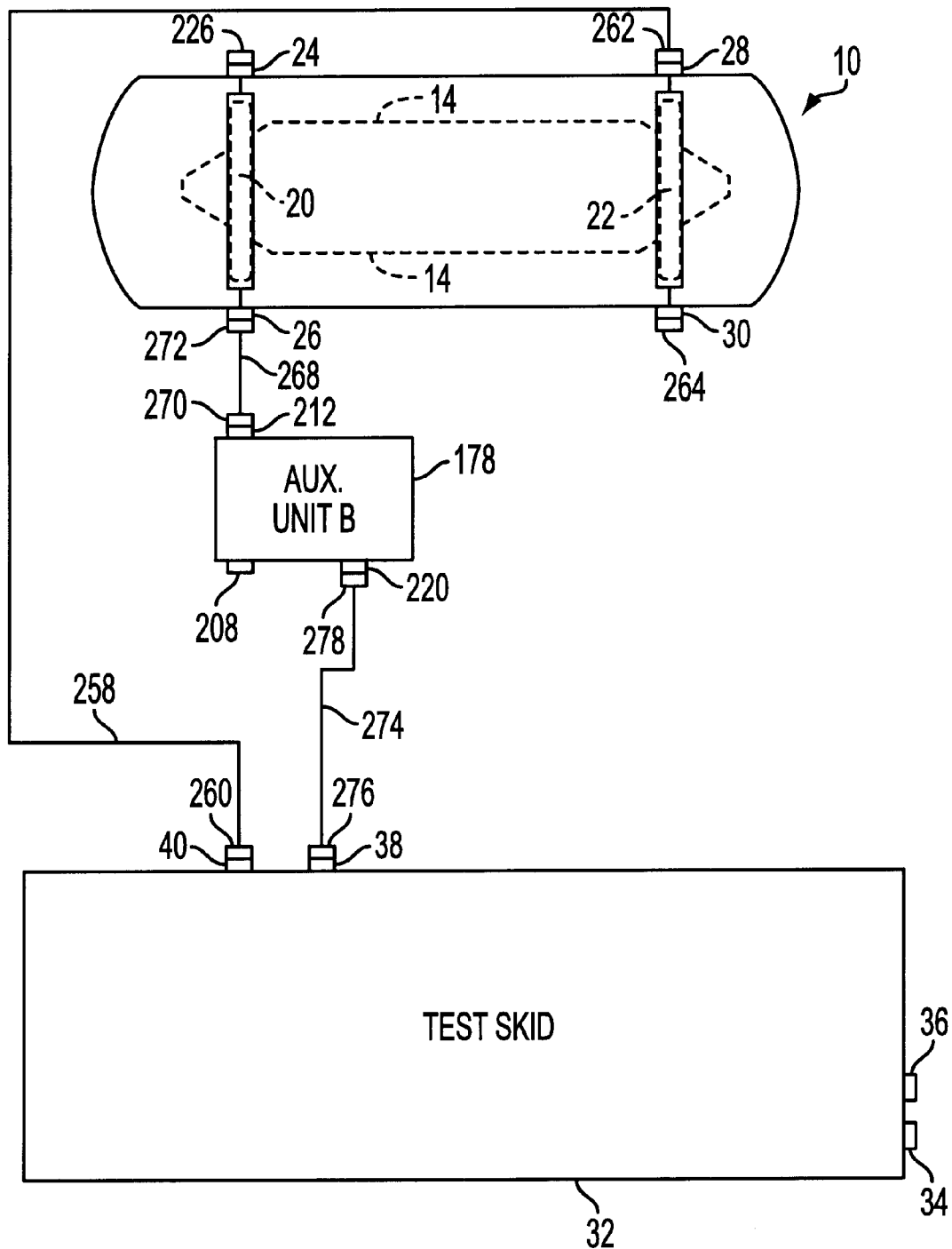
FIG. 6 illustrates the generator connected to the test skid during the vacuum drying stage.

With reference to FIG. 6, a conduit 258 is terminated at one end by a quick-connect coupling member 260 and at the other end by a quick-connect coupling member 262. The coupling member 260 plugs into the coupling member 40 and the coupling member 262 plugs into the coupling member 28 by quick disconnect couplers. A cap 264 plugs into the coupling member 30, and a cap 226 plugs into the coupling member 24 by quick disconnect couplers. A conduit 268 is terminated at one end by a quick-connect coupling member 270, which plugs into the coupling member 212, and at the other end by bolting to coupling member 26. The ends of a conduit 274 are terminated by quick-connect coupling members 276 and 278, which respectively plug into the coupling members 38 and 220. Although the conduits 258, 268, and 274 and their coupling members have been given different reference numbers in FIG. 6, in practice these conduits may be the same as the corresponding conduits illustrated in FIG. 5 for the pressure drying stage.

After the valves have been set as discussed above and the conduits have been connected as shown in FIG. 6, the vacuum pump 128 is tested. This is accomplished by closing valve 136 and valve 146 and pumping down to as low a pressure as possible. If the pump 128 is able to draw down the pressure to a predetermined value, such as 50 millitorr or below, the pump is determined to be satisfactory. Also, at this point the operation of the solenoid 152 is checked. The solenoid valve 152 should automatically open to vent the conduit 132 to atmosphere when the pump is tripped and close when the pump is started. The closing and opening operation of the solenoid valve 152 is checked by starting and stopping the pump 128 several times. The main purpose of the solenoid valve is to automatically break the vacuum in the conduits 132 and 140 in case the pump trips due to a power loss; otherwise, oil from the pump 128 may enter the conduits 132 and 166 and the stator bars 14. Oil in the stator bars 14 could cause a serious problem. A check valve 134 has also been provided to prevent oil from crossing conduit 132 and reaching valve 136.

Valves 146 and 136 are then opened again. Also, valve 138 is positioned to allow communication between the conduits 138 and 142. It should be noted again that the valve 146 has a very small aperture, and in the pumping procedure that follows, most of the air evacuated from stator 10 will pass through the valve 136.

After pump 128 has been tested, and valves 136 and 146 are opened, the stator 10 is pumped down to a predetermined moderate vacuum, such as 8 to 9 torrs. At this point the valve 164 is opened to supply nitrogen from cylinder 162, and valve 222 (which, as mentioned previously, has a range of intermediate positions between fully opened and fully closed) is opened very slightly to permit some of the nitrogen to flow into the stator bars 14. Note that the nitrogen is supplied through a pressure regulator (not shown) to maintain the pressure of the gas being supplied at about 1–2 psig. Valve 222 is adjusted so that the vacuum, as measured by either sensor 224 or sensor 168, remains at the predetermined moderate value of about 8–9 torr, with pump 228 running.

With the pump 128 running and nitrogen being injected, the vacuum is held at the moderate level (e.g., 8 to 9 torrs) for a predetermined period, such as eight hours. Injecting nitrogen has two purposes. One is that nitrogen has an affinity for water, and facilitates drying. The other reason for injecting nitrogen is to prevent the pressure from falling prematurely to a very low level. Water evaporates readily into a vacuum, but if the vacuum were too low to start with, the water droplets might evaporate fast enough to form ice crystals. The rate at which an ice crystal sublimates into a vacuum is lower than the rate at which water evaporates into the vacuum, and furthermore ice crystals might clog tiny passages and trap water in the tiny passages, shielding the trapped water from the vacuum.

Drying at a moderate vacuum of 8–9 torrs helps to alleviate the problem of ice crystal formation. Heat that has been stored in the stator during the second portion of the pressure drying stage helps in minimizing cooling of the water passages, and thus formation of ice crystals. Furthermore the evaporation of moisture is accelerated by the heat of the stator.

After introducing nitrogen for the predetermined period, such as eight hours, the valves 164 and 222 are closed to discontinue the nitrogen. The valves 136 and 146 are then closed with the vacuum in stator bars 14 at the eight to nine torrs, and the vacuum is sampled every five minutes for half an hour using vacuum sensors 224 and 168. The intention of this sampling is to verify whether the vacuum drying is possibly complete, or whether further vacuum drying is required. If the vacuum softens rapidly during this half hour period, the rise tells the technician who is conducting the test that a problem exists. The problem is likely to be due to one of two causes; either air is entering the vacuum system due to leakage in the stator bars 14 brazed joints or excessive amounts of water are still trapped in the stator bars 14 (this assumes that the couplings are not leaking since they were checked during the second portion of the drying stage). The test skid 32 is provided with redundant sensors and valves which permit a skillful and knowledgeable technician to isolate portions of the system from other portions and to measure various parameters at different locations while diagnosing any problems that occur during the test period.

If it is determined during the moderate vacuum test that excessive water remains in the stator 10, drying is resumed at the moderate vacuum while nitrogen is injected. This is continued for a predetermined period, such as four hours, and then another moderate-vacuum test is conducted to determine whether the vacuum remains fairly steady for half an hour. If necessary, further intervals of drying at a moderate vacuum while injecting nitrogen (or while injecting heated air from the pressure section 124) are conducted until the moderate vacuum remains relatively stable for the predetermined period with the nitrogen off.

After the system passes this test to see whether it can hold a moderate vacuum, the nitrogen injection is discontinued, valves 136 and 146 are opened, and pump 128 is started if it was stopped earlier. The pressure is reduced to its lowest possible value, preferably lower than 50 millitorrs. The vacuum is monitored using vacuum sensors 224 and 168 and the dewpoint is monitored using sensor 144. After the vacuum stops decreasing, to test whether the stator 10 is indeed thoroughly dried, valves 136 and 146 are closed and the vacuum is sampled at predetermined intervals for a predetermined period of time (such as every ten minutes for a half hour). If the pressure rises only minimally during this period (for example, from 50 millitorr to 100 millitorrs, the vacuum drying procedure is judged to be complete. The stator 10 is now prepared for the actual pressure and vacuum decay tests.

The pressure decay test is conducted before the vacuum decay test. This might seem odd, since stator bars 14 and the rest of the vacuum system are already in a hard vacuum state at the conclusion of the vacuum drying stage, but there is a reason for conducting the pressure decay test first. During the vacuum drying stage, it is possible that pinhole leaks in stator bars 14 may have been clogged by debris from the exterior of stator bars 14 that is sucked into the pinholes by the vacuum. Conducting the pressure decay test first tends to dislodge such clogs and thus increase the reliability of the vacuum decay test.

With auxiliary unit 178 remaining connected as shown in FIG. 6, the first step of the pressure decay test is to break the hard vacuum that remains upon completion of the vacuum drying stage. This is accomplished by opening valve 164 and gradually opening the continuously variable valve 222 so as to slowly introduce nitrogen into the stator 10. The technician conducting the test can monitor the softening of the vacuum using a vacuum sensor such as sensor 168. After the vacuum has been broken valves 170 and 226 are closed to isolate the vacuum sensors 168 and 224, and valves 174 and 218 are opened to connect the pressure sensors 172 and 216. Then, valves 146, 164 and 222 are closed, conduit 274 is disconnected, and the nitrogen cylinder 162 is disconnected from valve 164. The nitrogen cylinder 162 is then connected to coupling member 38 through a pressure regulator (not shown) set at 60 psig, and valves 122 and 106 are opened. The stator bars 14 are then charged with nitrogen to a predetermined pressure, such as 60 PSI, as measured by pressure sensor 172 or pressure sensor 216. After the predetermined pressure has been reached, valves 106, and 122 are closed. This isolates the pressurized stator. The pressure is then recorded hourly for 24 hours. Also, the temperature of the stator bars 14 and the barometric pressure of the surrounding atmosphere are recorded hourly at the same time the stator bar pressure is recorded. The temperature is monitored using sensors 280 that are present in the stator itself (see FIG. 7). The barometer readings are taken using a barometer (not shown) available in the skid. Note that it is sometimes not possible to record readings round the clock;

in such cases, at the minimum, four hourly readings at the beginning of the test and four hourly readings just before the end of the 24-hour test are recorded. The pressure decay rate L in cubic feet per day is then calculated using the following Formula 1:

$$L = \frac{239.36 V}{D} \left[ \frac{P1 + B1}{273 + T1} - \frac{P2 + B2}{273 + T2} \right] \tag{1}$$

Where:
L=Leakage rate (cubic feet per day);
V=Volume of stator 10 and connected conduits (a procedure for calculating this volume has been described later)
D=Duration of the test in hours;
P1 and P2=Initial and final pressures in inches of mercury (pressure in inches of Hg.=psig×2.04);
B1 and B2=Initial and final barometric pressure in inches of mercury; and
T1 and T2=Initial and final temperature of stator 10 in ° C.

The stator bars 14, the water headers 20 and 22, and the conduit 258 are judged to have passed the pressure decay test if the stator looses only one cubic foot of nitrogen over a period of 24 hours, after correcting for temperatures and barometric pressure. The one cubic feet of loss is to account for leakage through the insulating conduits between the stator bars 14 and the water headers.

After the pressure decay test is conducted, a vacuum decay test is performed. The nitrogen is bled off by opening valves 106, 122, and 164. When the pressure is reduced to about 1 PSI, as can be observed by opening valve 174 for sensor 172, valves 106 and 122 are closed. Also, the nitrogen cylinder 162 is reconnected to valve 164. Additionally, after the pressure decay test is conducted, the vacuum pump 128 is tested again. Assuming that the pump 128 is satisfactory, valves 136 and 146 are opened while the pump is operating. The pump 128 then starts vacuuming the stator bars 14.

At about 8 to 9 torr of vacuum, valves 136 and 146 are closed and a sample check of the vacuum is conducted, as was done during the vacuum drying stage. If the sample check of the vacuum is satisfactory, a hard vacuum is produced by again opening valves 136 and 146; otherwise, the low level vacuuming at 8–9 torr is continued with the nitrogen bleed, as was done during the vacuum drying stage. After the low level vacuum sampling has been done satisfactorily accomplished, a hard vacuum is produced and the vacuum and the dewpoint are recorded every 10 minutes until the vacuum continues to fall. When the vacuum stops falling, as indicated by sensors 168 and 224, and when the dewpoint has reached below −50° F., valves 136 and 146 are closed and vacuum sampling is performed again for half an hour. If the vacuum sampling is not satisfactory, vacuuming at 8–9 torr is continued using a nitrogen bleed for about 4 hours, and then vacuum sampling is repeated. Otherwise, the vacuum pump 128 is stopped and the vacuum decay test is conducted. Vacuum readings by sensors 224 and 168 are recorded at 5-minute intervals for 75 minutes.

In the vacuum decay test, the first 15 minutes of readings are ignored since outgassing due to the closure of valves may significantly increase the readings, and the pressure may reach as high as 250 milli torrs. The last 60 minutes of the readings taken at 5-minute intervals are used for calculating the vacuum decay test. In Formula 2 below, $\Delta$ is the difference of readings taken in microns (milli torrs) at the end of 75 minutes and 15 minutes of beginning the test.

Calculate the vacuum decay rate L using the following equation:

$$L = 3.06 \frac{V \times \Delta P \times 10^{-4}}{D} \tag{2}$$

Where
L=Leakage rate (cubic feet per day);
V=Volume (in cubic feet) of the stator 10 and Interconnecting conduits. Calculation of this volume is discussed below.
D(hours)=Test period (usually one hour); and
$\Delta P$=Change in vacuum (in microns or milli torr).

If the leakage rate determined in accordance with Formula 2 does not exceed a predetermined value, such as three cubic feet per day, the stator 10 is judged to have passed the vacuum decay test.

It is necessary to calculate the volume of the stator bars 14, both water headers 20 and 22, and the conduit 258 of FIG. 6 (which in actual practice is same as 242 in FIG. 5) in order to calculate the pressure and the vacuum decay rates. To calculate the volume, first break the vacuum by introducing nitrogen in stator bars 14 by closing valve 108 and opening valves 164 and 222, as was done above after completing the vacuum drying stage. When the nitrogen pressure reaches to about 1 psig, close valves 164 and 222, and open valve 204 to vent out the stator bars 14. After a zero pressure is indicated in the stator bars 14 by either of the sensors 172 or the 216, close valve 204. Next, open valve 112 and close valve 106 if it is not already closed. Open valves 46 and 54 manually to allow air to pressurize the air receiver 56. At about 60 psig air receiver pressure (measured by pressure sensor 72), close valves 46 and 54. Record this air receiver pressure, calling it P1 psig. Now open valve 106. Record the new pressure P2 using the sensor 72. The P2 reading will first drop and then stabilize. Record this stabilized P2 reading. Using the following Formula 3, calculate the volume V in cubic feet of the stator bars 14, water headers and the conduit 242:

$$V(C.Ft.) = (V1(P1-P2))/P2 \tag{3}$$

V1 in Formula 3 is the volume of the air receiver (for example, 27.6 cubic feet).

If the stator bars 14 pass both the pressure decay test and the vacuum decay test, the generator can be returned to service. If the stator 10 fails either of these tests, the generator is typically opened to permit technicians to conduct further tests (such as tracer gas testing and capacitance testing) to locate the leak or leaks so that they can repaired.

Figure 7:
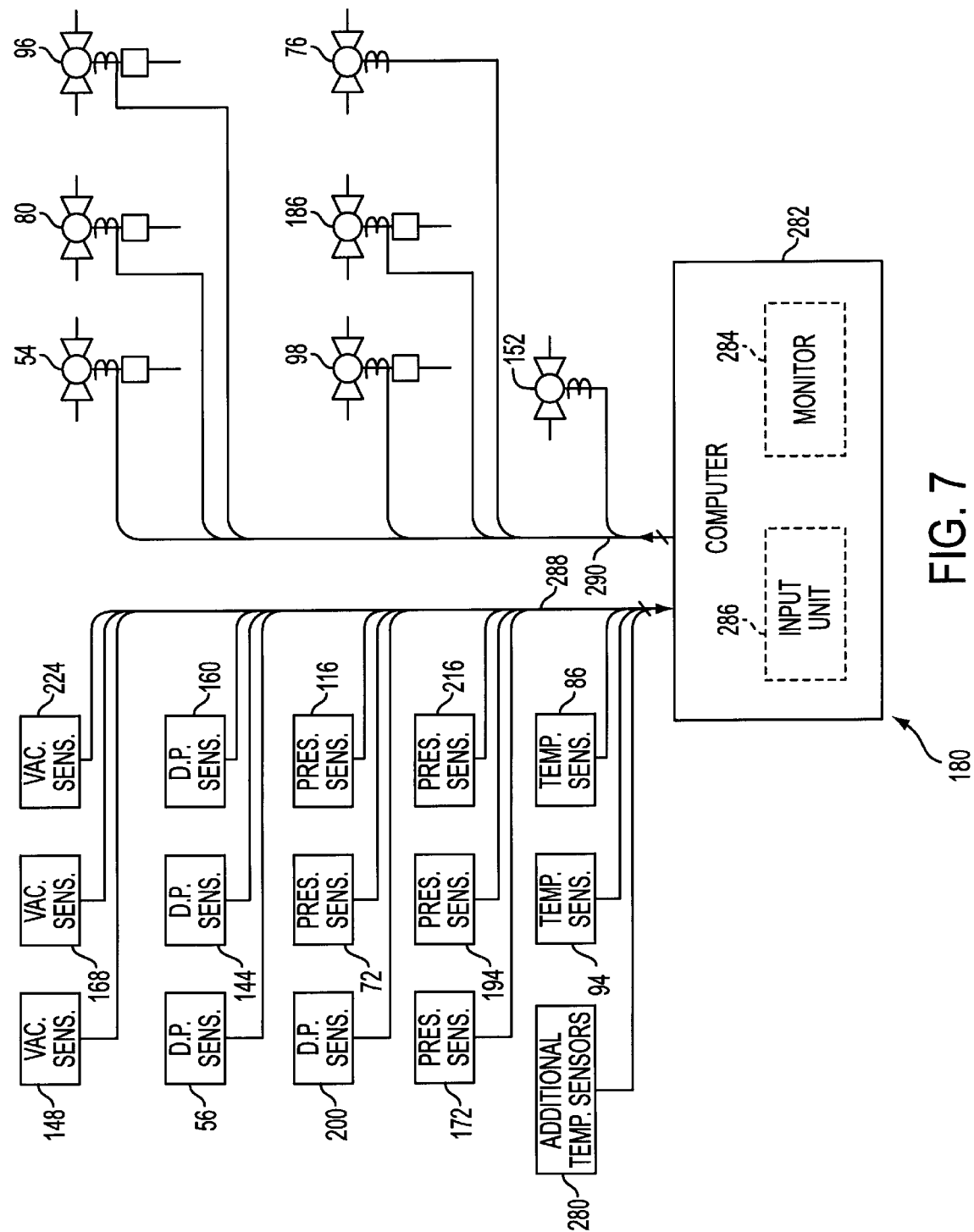
FIG. 7 schematically illustrates an electrical system for the test skid.

FIG. 7 schematically illustrates the electrical control and evaluation system 180. It includes a computer 282 having a monitor 284 and an input 286 (which may include a keyboard and a touch screen that cooperates with the monitor 284). The sensors supply input signals to input unit 286 via a bus 288 and the computer generates control signals that are supplied to the valves via a bus 290.

While the generator under test in the foregoing detailed description is a water-cooled general electric generator with 84 stator bars, it will be apparent that generators produced by other manufacturers, and generators having a different number of stator bars, can also be tested using the techniques disclosed herein.

It will be understood that the above description of the present invention is susceptible to various modifications, changes, and adaptations, and the same are intended to be comprehended within the meaning and range of equivalents of the appended claims.

What I claim is:

1. A method for leakage testing a water-cooled stator having water channels, comprising the steps of:
   (a) drying the water channels, step (a) comprising the steps of
       (a-1) receiving compressed air into an air receiver,
       (a-2) conveying compressed air from the air receiver along a first flow path from the air receiver to the water channels of the stator,
       (a-3) heating the compressed air as it moves along the first flow path from the air receiver to the water channels,
       (a-4) receiving compressed air into the air receiver, and
       (a-5) conveying the compressed air from the air receiver along a second flow path from the air receiver to the water channels of the stator without heating the compressed air as it moves along the second flow path, at least a portion of the second flow path being different from the first flow path; and
   (b) conducting at least one of a pressure decay test and a vacuum decay test after the water channels are dried,
   wherein steps (a-4) and (a-5) are conducted before steps (a-1) to (a-3).

2. The method of claim 1, wherein steps (a-1) to (a-3) are conducted repeatedly in cycles.

3. The method of claim 1, wherein step (a-3) is conducted using an electric heater having a power rating of at least 3,000 watts.

4. The method of claim 3, wherein step (a-3) is conducted so that the compressed air has a temperature of at least about 100° F. as the compressed air leaves the heater.

5. The method of claim 1, wherein step (a-3) is conducted so that the compressed air has a temperature of at least about 90° F. as it enters the water channels.

6. The method of claim 1, wherein step (b) comprises conducting both a pressure decay test and a vacuum decay test.

7. The method of claim 6, wherein the step of conducting the vacuum decay test comprises removing gas from the water channels and sensing the dewpoint of the gas that is removed using a dewpoint sensor, and wherein step (a) further comprises measuring the dewpoint of the compressed air using the same dewpoint sensor.

8. A test skid for leakage testing a water-cooled stator having water channels, comprising:
   a conduit for connection to the water channels;
   pressure section means for supplying compressed air to the conduit, the pressure section means comprising an air receiver, means for conveying compressed air from the air receiver to the conduit along a first path, a heater to heat the air moving along the first path, and means for conveying compressed air from the air receiver to the conduit along with a second path, at least a portion of the second path being different from the first path and bypassing the heater; and
   vacuum section means for applying a vacuum to the conduit.

9. A method for leakage testing a water-cooled stator having water channels, comprising the steps of:
   (a) drying the water channels, step (a) comprising the steps of
       (a-1) receiving compressed air into an air receiver,
       (a-2) conveying compressed air from the air receiver along a first flow path from the air receiver to the water channels of the stator, and
       (a-3) heating the compressed air as it moves along the first flow path from the air receiver to the water channels; and
   (b) conducting both a pressure decay test and a vacuum decay test after the water channels are dried.

10. The method of claim 9, wherein the step of conducting the vacuum decay test comprises removing gas from the water channels and sensing the dewpoint of the gas that is removed using a dewpoint sensor, and wherein step (a) further comprises measuring the dewpoint of the compressed air using the same dewpoint sensor.

* * * * *